United States Patent
Linzenkirchner et al.

(10) Patent No.: US 6,360,212 B1
(45) Date of Patent: Mar. 19, 2002

(54) PROCESS FOR DESIGNING A FUZZY REGULATOR

(75) Inventors: Edmund Linzenkirchner, Eggenstein/Leopoldshafen; Hans-Peter Preuss, Karlsruhe, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/446,697

(22) PCT Filed: Dec. 10, 1993

(86) PCT No.: PCT/DE93/01184

§ 371 Date: May 29, 1997

§ 102(e) Date: May 29, 1997

(87) PCT Pub. No.: WO94/14113

PCT Pub. Date: Jun. 23, 1994

(30) Foreign Application Priority Data

Dec. 11, 1992 (DE) .......................................... 42 41 920

(51) Int. Cl.⁷ .......................... G06F 15/18; G06F 17/00
(52) U.S. Cl. ............................... 706/4; 706/47; 706/900
(58) Field of Search ............................... 395/3; 706/1–4, 706/7–9, 52, 900, 47

(56) References Cited

U.S. PATENT DOCUMENTS

| | | | | |
|---|---|---|---|---|
| 5,179,634 A | * | 1/1993 | Matsunaga et al. | 706/59 |
| 5,208,898 A | * | 5/1993 | Funabashi et al. | 706/45 |
| 5,239,620 A | * | 8/1993 | Yamakawa et al. | 706/60 |
| 5,440,672 A | * | 8/1995 | Araki et al. | 706/12 |
| 5,487,130 A | * | 1/1996 | Ichimori et al. | 706/61 |

FOREIGN PATENT DOCUMENTS

EP    0 513 689    11/1992

OTHER PUBLICATIONS

IEEE Transactions On Systems, Man And Cybernetics, vol. 20, No. 5, 1990, New York, US, pp. 1115–1124, Liang–Jong Huang et al.: A Self–Paced Fuzzy Tracking Controller for Two–Dimensional Motion Control.

* cited by examiner

*Primary Examiner*—George B. Davis
(74) *Attorney, Agent, or Firm*—Kenyon & Kenyon

(57) ABSTRACT

In a process for designing a fuzzy regulator with at least one input parameter and at least one output parameter (x1, x2, y), where an incomplete rule base with rules that are defined explicitly is supplemented by an implicit rule whose conditional part yields a truth value that has its greatest value when the explicit rules yield a truth value of 0 and is the smallest when the explicit rules have a truth value of 1, the truth value of the implicit rule may be determined by forming the maximum from the truth values of the explicit rules and calculating the complement to 1. This leads to a great simplification of the design of the regulator and prevents instabilities that can occur with an incomplete rule base.

13 Claims, 7 Drawing Sheets

PROCESS FOR DESIGNING A FUZZY REGULATOR

BACKGROUND OF THE INVENTION

This invention concerns a process for designing a fuzzy regulator with at least one input parameter and at least one output parameter.

The principles of fuzzy regulators are described, for example, in the article "Fuzzy Control—Heuristic Regulation by Means of Fuzzy Logic" by Hans-Peter Preuβ, published in "atp" (1992), no. 4, pages 176–183 and "atp" (1992), no. 5, pages 239–246. The fuzzy regulators described there are used for open- and closed-loop control processes, for optimization of processes and for heuristic strategies by means of fuzzy logic. In fuzzy regulation, the fuzzy regulator may essentially have any desired number of input and output parameters.

To design a fuzzy regulator in accordance with the present invention, first the numerical value ranges of the input and output parameters are characterized qualitatively by linguistic values such as "small," "medium" or "large." Each linguistic value is described by the membership function which quantifies the qualitative information provided by a linguistic value in such a manner that it yields a truth value for each numerical value occurring for a process parameter. Through this process, which is also known as fuzzification, the operating range of the process in question is divided into "fuzzy" sub-ranges. The number of sub-ranges corresponds to the number of linguistic values of an input parameter, or when there are several input parameters, the number of sub-ranges corresponds to the number of possible combinations of linguistic values of different input parameters. The control strategy is determined by IF-THEN rules for each of these sub-ranges or for several sub-ranges together. These rules are stored in a rule base. For each of these rules, a conclusion is given in the conditional part as a linguistic value whereby a combination of linguistic values of the input parameter may be provided, for example, by a linkage with the "AND" or "OR" operators.

To calculate the truth value of the conditional part, the truth values obtained from the membership functions of the individual inputs are linked through the appropriate operators used in the rules. In the operation identified as "inference" of calculating the conclusions for the individual rules, for example the membership function of the output parameters, named as the corresponding linguistic value in a rule, is limited to the truth value supplied by the conditional part of the rule. In the operation called "composition," the effects of the rules concerning an output parameter are mutually superimposed, e.g. by forming the maximum of all membership functions of the output parameters. Finally, the calculation of the output parameter, referred to as "defuzzification," follows. This is done, for example, by calculating the position of the center of gravity of the surface defined by all the limited membership functions over the value range of the output parameters.

A rule base is incomplete if a rule is not expressly assigned to each of the aforementioned sub-ranges of the process. On the other hand, each linguistic value of the output parameter does not have to be specified in a rule as a conclusion. It is disadvantageous that output parameters that are unfavorable for the control may arise in operating states not covered by a rule.

SUMMARY OF THE INVENTION

An object of the present invention is to provide a process for a fuzzy regulator allowing an incomplete rule base to be supplemented in a simple manner and thus providing a fuzzy regulator that does not cause instabilities in the control circuit.

In fact, the truth value of the conditional part of the implicit rule is determined from the truth values of the conditional parts of the explicit rules by selecting the maximum value and forming the complement to the value 1 by using the equation:

$$W_j = 1 - \max(W_i)$$

where $i = 1, \ldots, n, i \neq j,$ n=number of linguistic values of an output parameter and $w_j$=truth value of the implicit rule for the j-th linguistic value of the output parameter.

In addition, the truth value of the conditional part of the implicit rule is reduced by an evaluation factor. The truth value of the conditional part of the implicit rule may be linked to the truth value of the conditional part of another explicit rule.

Furthermore, the truth value of the conditional part of the implicit rule is linked to the truth value of the conditional part of one of the explicit rules, and the result of this linkage is used as its new truth value. With the new design process, a fuzzy regulator having favorable characteristics in the control circuit is available.

BRIEF DESCRIPTION OF THE DRAWINGS

This invention as well as its advantages and embodiments are explained in greater detail below with reference to the figures, which illustrate embodiments of this invention.

DETAILED DESCRIPTION

Figure 1:
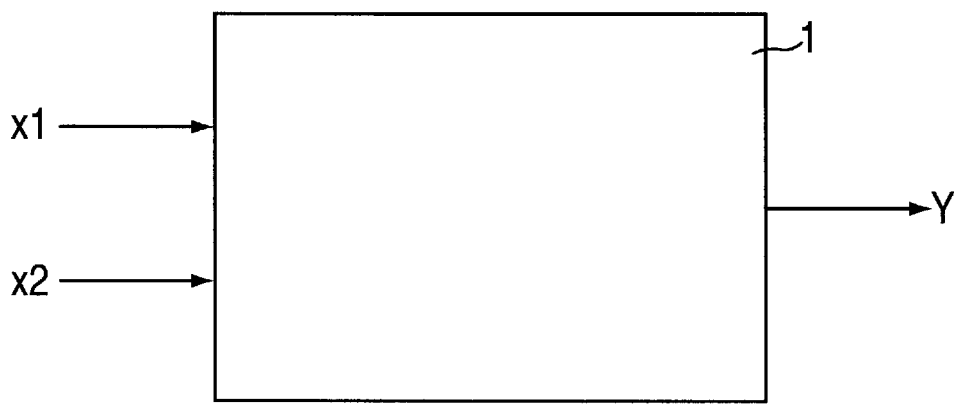
FIG. 1 shows a block diagram of a fuzzy regulator with two input parameters and one output parameter.
Figure 2:
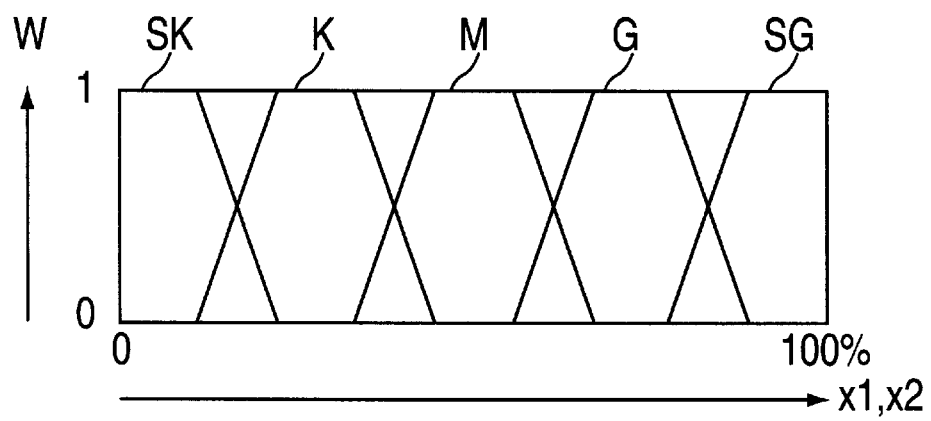
FIG. 2 shows the membership functions for the input and output parameters.
Figure 2:
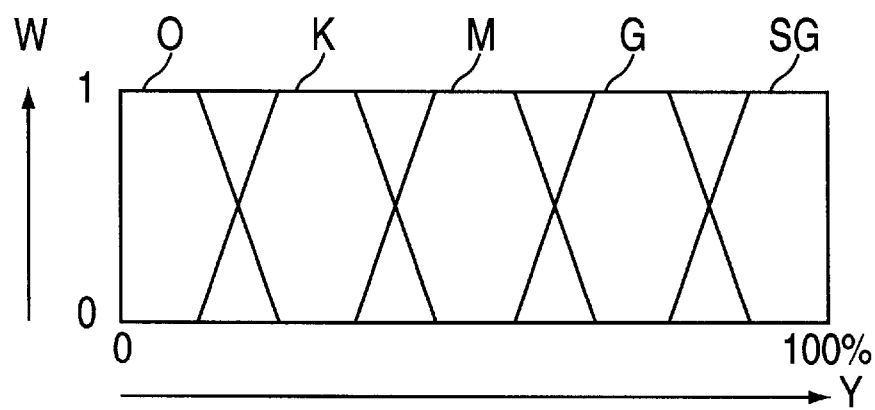

FIG. 1 shows a fuzzy regulator 1 with two input parameters x1 and x2 and one output parameter y. FIG. 2 shows the membership functions of these process parameters for the linguistic variables SK (very small), K (small), M (medium), G (large), SG (very large) and in the lower chart 0, K (small), M (medium), G (large) and SG (very large). The membership function is used to determine, for example, the truth value W of the statement "x1=K" which has a value of 1 when the input parameter x1 has a value of 25%, but is 0 for larger value of x1.

Figure 3:
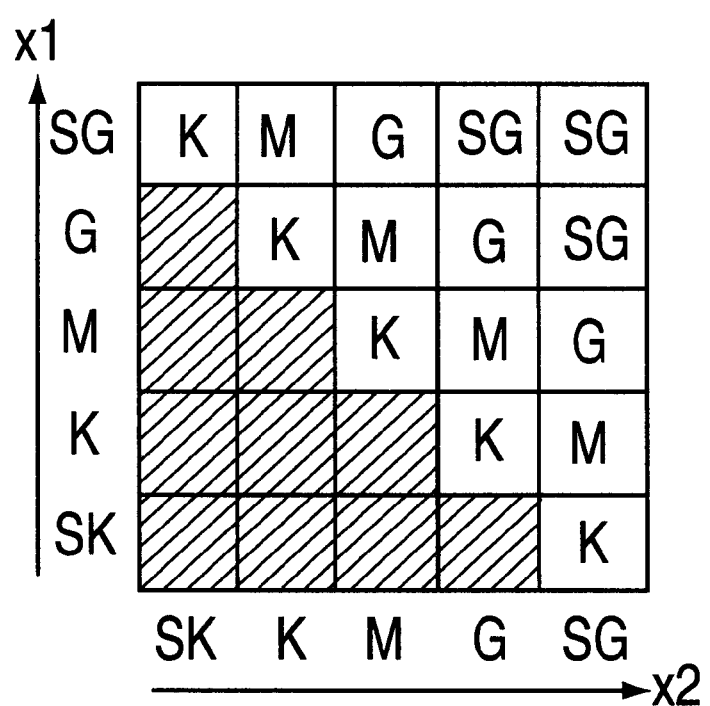
FIG. 3 shows an example of an incomplete rule base.

The rule base for this embodiment can be represented in a matrix corresponding to FIG. 3 with only two input parameters x1 and x2. In this matrix, linguistic values for the output parameter are assigned to the respective combinations of linguistic values of the input parameters. For example, one of the rules of this rule base is: IF (x1=SG AND (x2=G OR x2=SG) OR (x1=G AND x2=SG)) THEN y=SG. In the shaded areas in the lower left portion of the matrix, the value of the output parameter y should assume the linguistic value of 0. Of course, a rule could have also been defined explicitly for this condition, but in this embodiment it is assumed that there is no such rule. Then no defined behavior of the fuzzy regulator can be expected for these areas.

Figure 4:
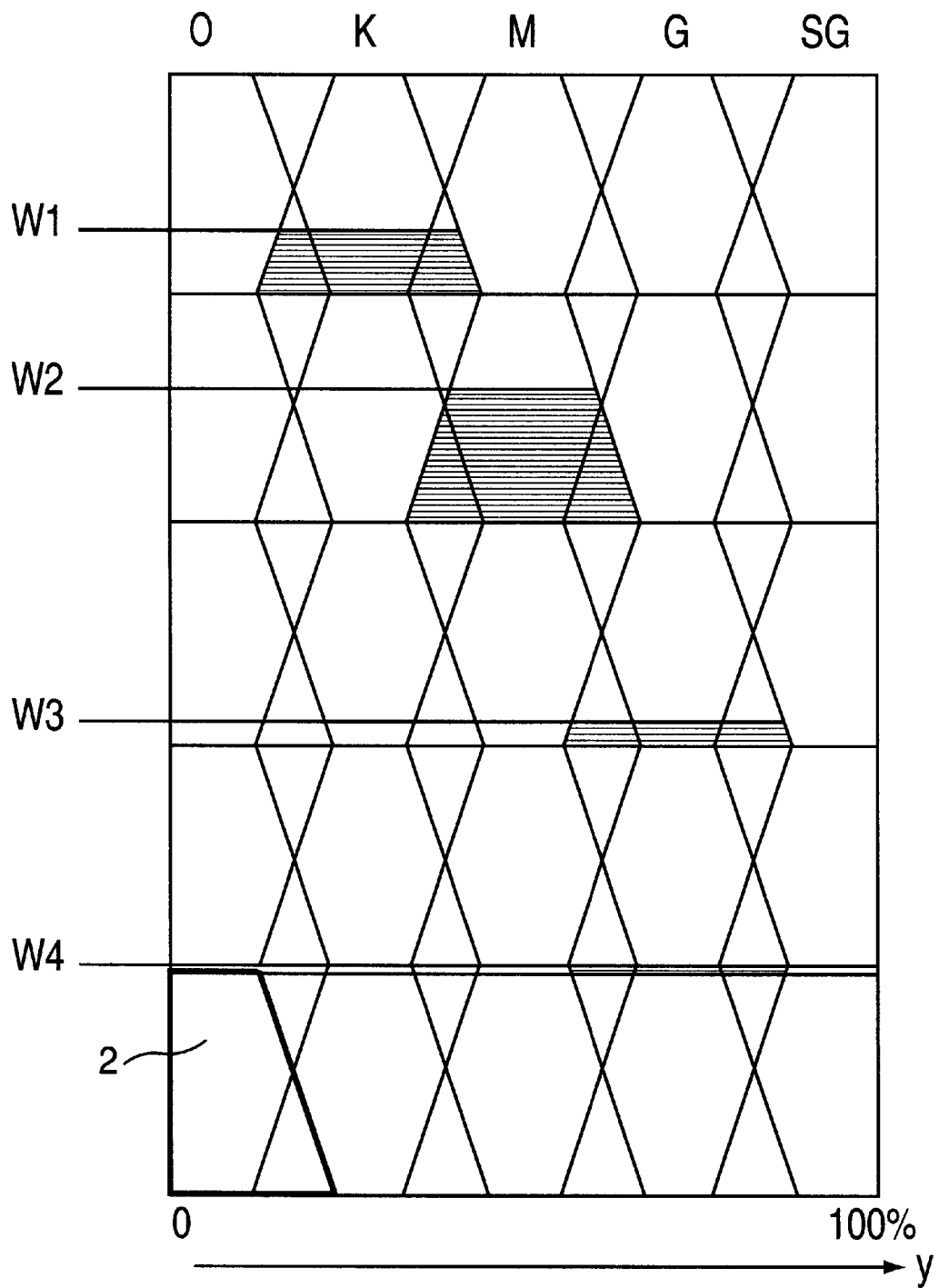
FIG. 4 shows the result of the inference for the individual rules in the case of an incomplete rule base.
Figure 5:
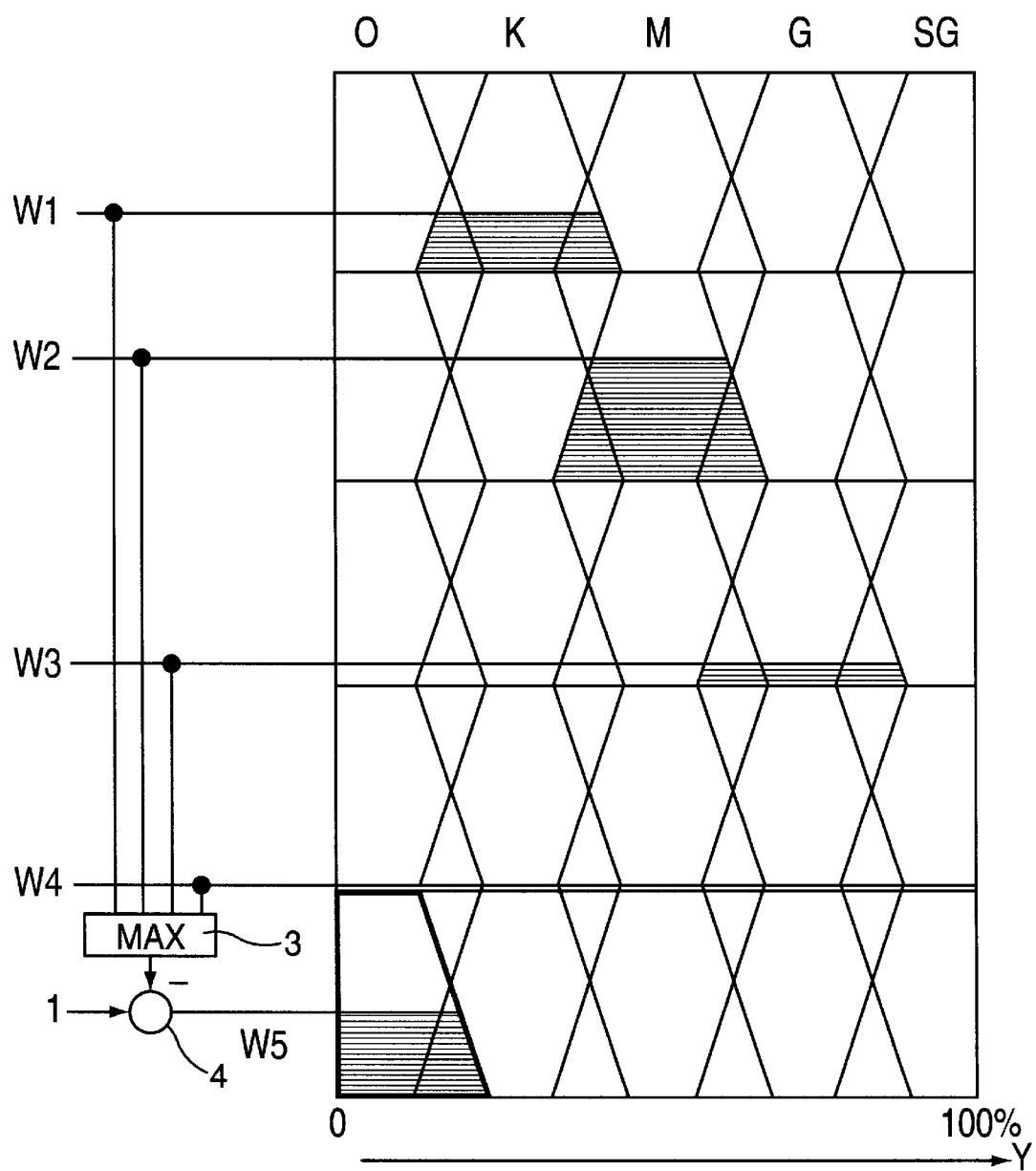
FIG. 5 shows the result of the inference with an implicit rule as a replacement for a missing rule.

The result of the inference according to FIG. 4 also shows that with the membership functions of the output parameter y shown for a process state as an example, the membership function 2 does not yield any truth value for the linguistic value 0 which is shown in bold in FIG. 4. However, truth values W1, W2, W3 and W4 are established by the inference for the linguistic values K, M, G and SG. However, if all the explicitly formulated rules for these linguistic values of the output parameter yield the truth value 0, then a defined output signal y of the fuzzy regulator must be obtained by using an implicit rule according to FIG. 5. In the diagram of FIG. 5, the same operating state as in FIG. 4 was selected. According to this invention, the truth values W1, W2, W3 and W4 of the existing explicit rules for selection of the maximum value are sent to a maximum value forming unit 3 at whose output the largest of the truth values that are calculated by the explicit rules appears. By subtracting this maximum value from 1 in a subtracter 4, the complement of the output value of the maximum value forming unit 3 is obtained. In this embodiment, the truth value W5 thus obtained is used to treat the membership function of the output parameter for the linguistic value 0 that is not addressed by explicit rules according to the inference mechanisms of the fuzzy regulator. This implicit rule has the advantage that the above-mentioned linguistic value 0 of the output parameter is continuously active to the extent to which the efficacy of the explicit rules is diminished. This advantage is apparent especially in the areas in FIG. 3 where the membership functions of the input parameters x1 and x2 overlap at the boundaries with the shaded area due to their fuzziness. In another embodiment of this invention, a numerical value of the output parameter y can also be entered directly in the leading part of the implicit rule instead of a linguistic value.

The implicit rule according to FIG. 5 can also be described mathematically by the equation:

$$W_j = 1 - \max(W_i)$$

where i=1, . . . , n, i≠j, n=number of linguistic values of the output parameter and $W_j$=truth value obtained by the implicit rule for the j-th linguistic value of the output parameter.

This equation is selected in general so that the implicit rule can be used not only for the linguistic value 0 but also for calculating any other linguistic value of the starting parameter.

Figure 6:
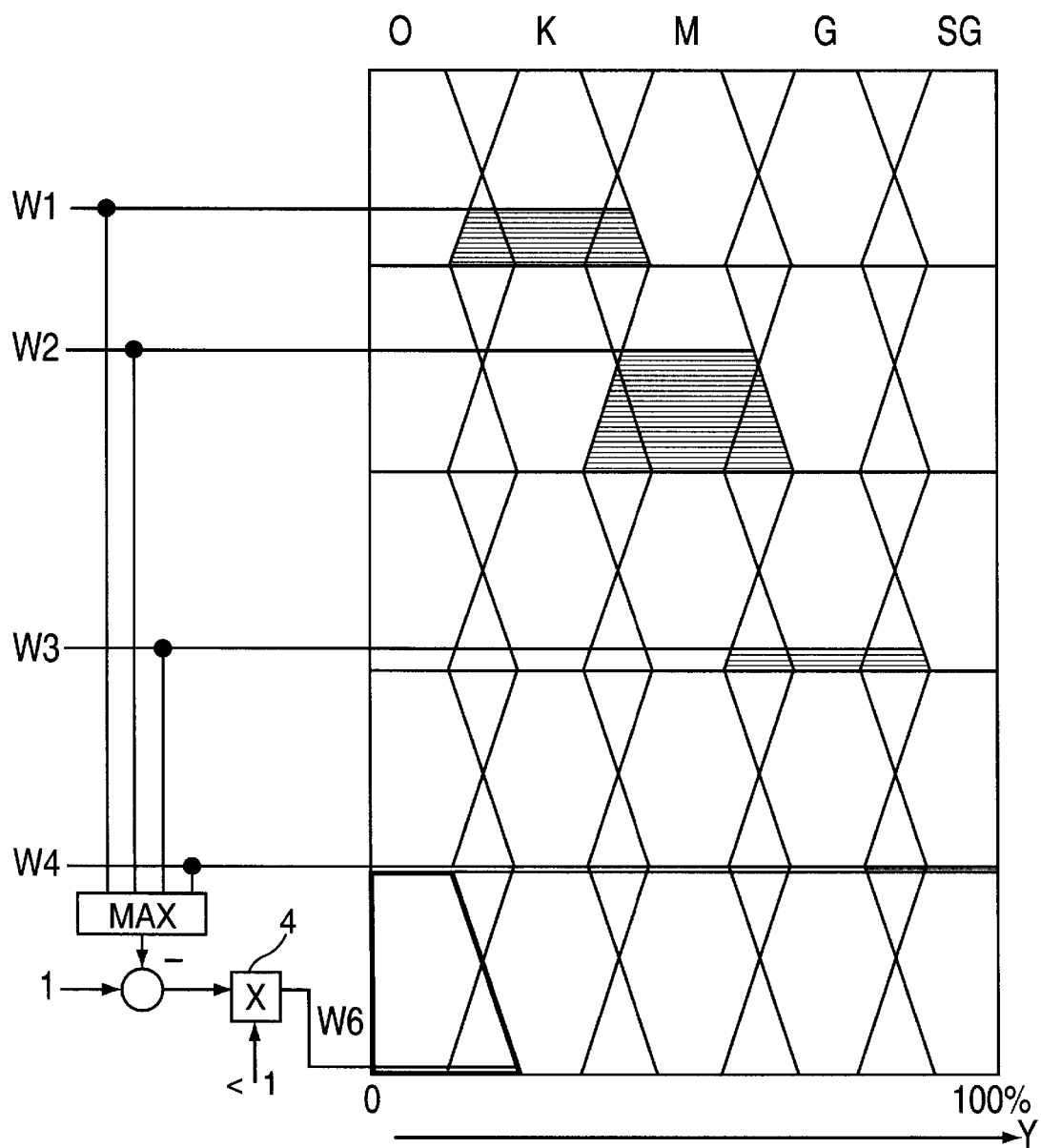
FIG. 6 shows the implicit rule according to FIG. 5 plus an additional evaluation.

The implicit rule shown in FIG. 5 yields a truth value that is greater than zero as soon as the explicit rule that creates the highest truth value yields a truth value smaller than one. In the embodiment according to FIG. 3, this can occur not only at the borders with the shaded area where the implicit zero rule should apply, 30 but also at the boundaries between the sub-ranges defined by the explicit rules. In these sub-ranges, the membership functions of the input parameters x1 and x2 yield truth values smaller than one, which also leads to comparable truth values for all the conditional parts of the explicit rules. In these cases, the implicit rule according to FIG. 5 becomes active and can produce an unwanted change in the regulator response. As shown in FIG. 6, this effect can be reduced by attenuation of the truth value calculated with the implicit rule without losing the advantage of the implicit rule. In FIG. 6 the truth value W6 of the linguistic value 0 of the output parameter y is determined from the complement of the maximum value of the truth values W1 . . . W4 of explicit rules according to an evaluation by a multiplier 4 by a factor that is smaller than one.

Figure 7:
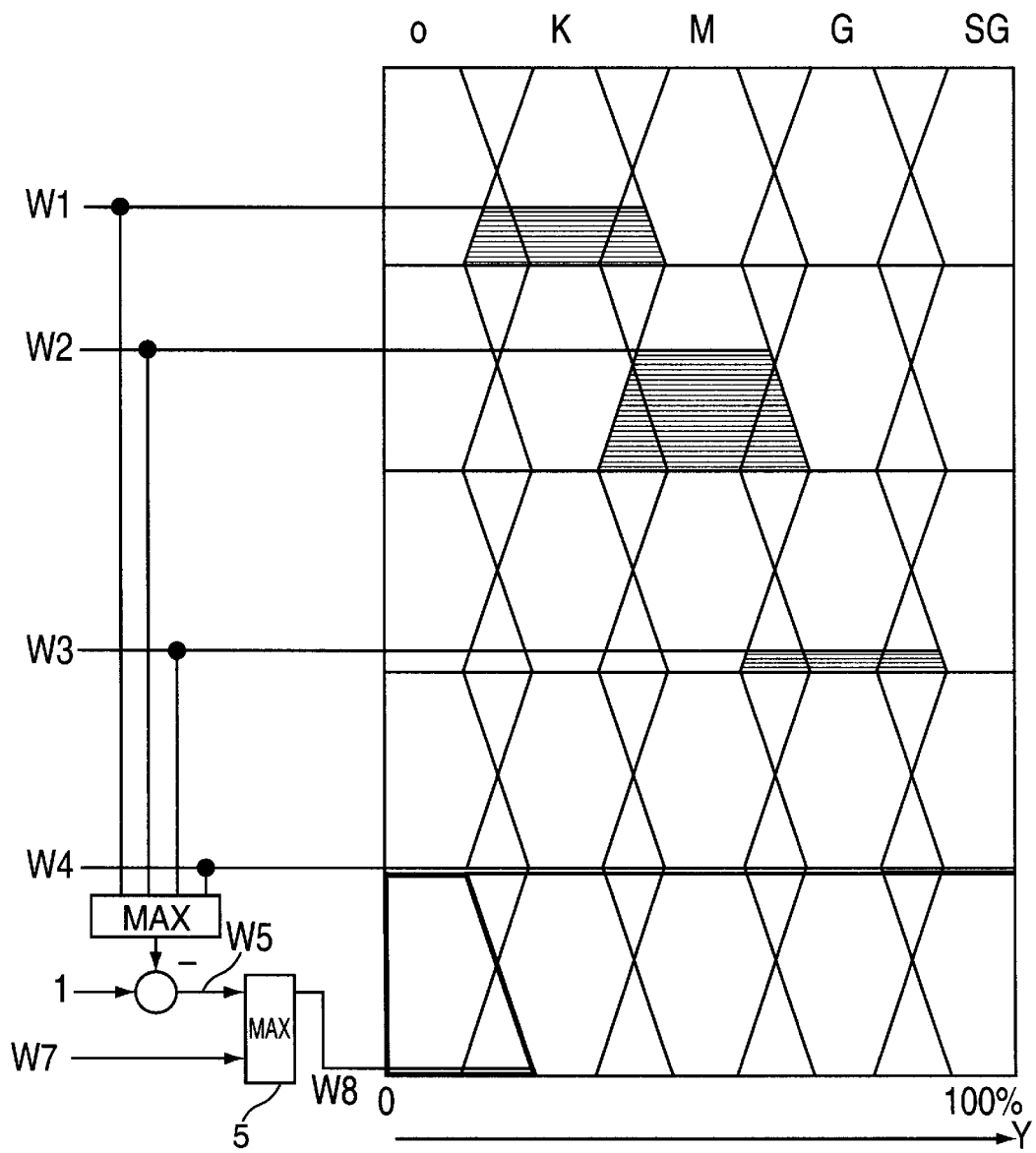
FIG. 7 shows the implicit rule according to FIG. 5, combined with an explicit rule.

With the device shown in FIG. 7, an explicit rule that yields the truth value W7 can also be defined for the linguistic value 0 of the output parameter y that is addressed by an implicit rule. The truth values W5 and W7 formed by the implicit and explicit rules are sent to a maximum value forming unit 5, so the larger of the two becomes the effective truth value W8.

Figure 8:
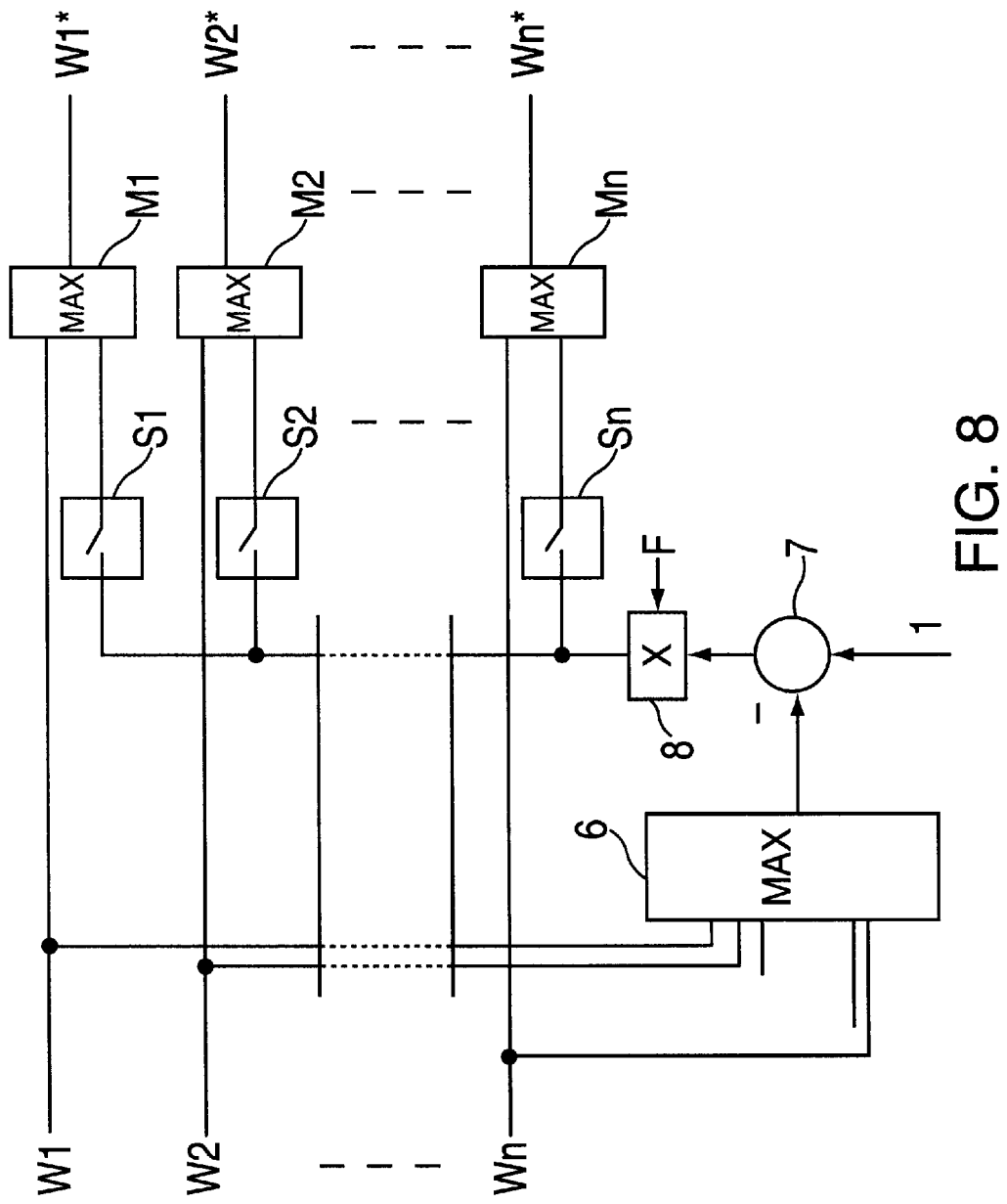
FIG. 8 shows a universal structure of an implicit rule.

In a universal structure of a device for implementation of an implicit rule, as shown in FIG. 8, the truth values W1 . . . Wn obtained by explicit rules are sent to a maximum value forming unit 6. A subtracter 7 calculates the complement of 1 from the output signal of the maximum value forming unit 6. The complement is evaluated in a multiplier 8 by a factor F, the size of which is between 0 and 1. The result of this evaluation can be applied to one or more of the maximum value forming units M1 . . . Mn by switches S1 . . . Sn. Since one of the truth values W1 . . . Wn is sent to each of the maximum value forming units M1 . . . Mn at the same time, the result of the implicit rule can be used to calculate the inference with any of the defined linguistic values of the output parameter.

What is claimed is:

1. A process for designing a fuzzy regulator with at least one input parameter and at least one output parameter comprising the steps of:

a) defining linguistic values by establishing membership functions for each input and output parameter of the fuzzy regulator;

b) creating a rule base with explicit rules in which a linguistic value of an output parameter is defined as a conclusion for a combination of linguistic values of the input parameters linked with operators in a conditional part;

c) supplementing the rule base for a combination of linguistic values that have not been assigned any linguistic value of an output parameter by at least one of the explicit rules by adding an implicit rule whose truth value in the conditional part depends on the truth values of the conditional part of the explicit rules such that the truth value has a highest value when the explicit rules yield a truth value of 0 and the truth value has a smallest value when the explicit rules yield a truth value of 1; and assigning, as a function of the implicit rule and the explicit rules, a predetermined value as the output parameter of the fuzzy regulator.

2. The process of claim 1, wherein the truth value of the conditional part of the implicit rule is determined from the truth values of the conditional parts of the explicit rules by selecting a maximum value and forming a complement to the value of 1 by using the equation:

$$W_j = 1 - \max(W_i)$$

where

I=1, . . . , n, I≠j, $W_i$=truth value of the explicit rule for the I-th linguistic value of the output parameter, n=number of linguistic values of an output parameter, and $W_j$=truth value of the implicit rule for the j-th linguistic value of the output parameter.

3. The process of claim 2, wherein the truth value of the conditional part of the implicit rule is reduced by an evaluation factor.

4. The process of claim 3, wherein the truth value of the conditional part of the implicit rule is linked to the truth value of the conditional part of another explicit rule.

5. The process of claim 2, wherein the truth value of the conditional part of the implicit rule is linked to the truth value of the conditional part of another explicit rule.

6. The process of claim 1, wherein the truth value of the conditional part of the implicit rule is linked to the truth value of the conditional part of another explicit rule.

7. The process of claim 6, wherein the truth value of the conditional part of the implicit rule is linked to the truth value of the conditional part of one of the explicit rules to form a rule result, the rule result being assigned as a new truth value of the conditional part.

8. The fuzzy regulator obtained by the design process of claim 1.

9. A device, comprising:
a fuzzy regulator having at least one input parameter and an output parameter and an incomplete rule base under which no linguistic value of the output parameter is assigned for a combination of the at least one input parameter; and
a controller for completing the incomplete rule base of the fuzzy regulator by supplementing the incomplete rule base by an implicit rule having a first truth value in a conditional part, the first truth value being dependent on second truth values of conditional parts of the explicit rules of the incomplete rule base, the first truth value having a highest value when the explicit rules generate a value of 0, the first truth value having a smallest value when the explicit rules generate a value of 1, and
wherein the controller provides a predetermined value to the output parameter of the fuzzy regulator.

10. The device according to claim 9, wherein the first truth value of the conditional part of the implicit rule is determined from the second truth values of the conditional parts of the explicit rules by selecting a maximum value and forming a complement to the value of 1 by using the equation:

$$W_j = 1 - \max(W_i)$$

where $I = 1, \ldots, n, I \neq j$, $W_i$=second truth value of the explicit rule for the I-th linguistic value of the output parameter, n=number of linguistic values of an output parameter, and $W_j$=first truth value of the implicit rule for the j-th linguistic value of the output parameter.

11. The device according to claim 10, wherein the first truth value of the conditional part of the implicit rule is reduced by an evaluation factor.

12. The device according to claim 9, wherein the first truth value of the conditional part of the implicit rule is linked to a third truth value of the conditional part of another rule of the incomplete rule base.

13. The device according to claim 12, wherein the first truth value of the conditional part of the implicit rule is linked to the second truth values of the conditional part of one of the explicit rules to form a rule result, the rule result being assigned as a new truth value of the conditional part.

* * * * *